(12) United States Patent
Zur et al.

(10) Patent No.: US 9,901,850 B2
(45) Date of Patent: Feb. 27, 2018

(54) SELF CLEANING FILTER SYSTEM

(75) Inventors: Boaz Zur, Hakerem (IL); Rudolph Kaner, Karmiel (IL); Ruven Shtekelmacher, Korazim (IL); Yitzhak Sabag, Mishmar Hayarden (IL)

(73) Assignee: AMIAD WATER SYSTEMS LTD., D.N. Upper Galil (IL)

(*) Notice: Subject to any disclaimer, the term of this patent is extended or adjusted under 35 U.S.C. 154(b) by 719 days.

(21) Appl. No.: 13/990,938

(22) PCT Filed: Dec. 1, 2011

(86) PCT No.: PCT/IL2011/050039
§ 371 (c)(1),
(2), (4) Date: Jun. 25, 2013

(87) PCT Pub. No.: WO2012/073247
PCT Pub. Date: Jun. 7, 2012

(65) Prior Publication Data
US 2013/0270163 A1 Oct. 17, 2013

Related U.S. Application Data

(60) Provisional application No. 61/419,026, filed on Dec. 2, 2010.

(51) Int. Cl.
*B01D 24/46* (2006.01)
*B01D 29/68* (2006.01)
*B01D 29/11* (2006.01)

(52) U.S. Cl.
CPC ............ *B01D 29/68* (2013.01); *B01D 29/117* (2013.01); *B01D 29/686* (2013.01); *B01D 29/688* (2013.01); *B01D 2201/082* (2013.01)

(58) Field of Classification Search
None
See application file for complete search history.

(56) References Cited

U.S. PATENT DOCUMENTS

| | | |
|---|---|---|
| 5,132,013 A | 7/1992 | Thompson |
| 5,268,095 A | 12/1993 | Barzuza |

(Continued)

FOREIGN PATENT DOCUMENTS

| | | |
|---|---|---|
| CL | 0573-91 | 6/1991 |
| CL | 2152-97 | 10/1997 |

(Continued)

OTHER PUBLICATIONS

International Search Report for International Application No. PCT/IL2011/050039, 2 pages, dated Feb. 22, 2012.

(Continued)

*Primary Examiner* — Richard Gurtowski
(74) *Attorney, Agent, or Firm* — Vorys, Sater, Seymour & Pease LLP

(57) ABSTRACT

Provided is a fluid filtration unit including a housing accommodating a stationary cylindrical filter element, defining a raw fluid chamber extending between an inlet of the housing and raw fluid face of the cylindrical filter element, and a filtered fluid chamber extending between a filtered fluid face of the filter element and an outlet from the housing. A flushing and backspraying assembly includes at least one flushing pipe coupled to a lower pressure source and extending within the raw fluid chamber, and configured with a plurality of flushing nozzles disposed in close proximity with the raw fluid face of the filter element, and at least one backspraying arm coupled to a pressurized fluid source and extending within the filtered fluid chamber and configured with an array of backspraying nozzles disposed in close proximity with the filtered fluid face of the filter element, and a driving mechanism for selectively imparting the flushing and backspraying assembly with rotary and linear motion.

19 Claims, 11 Drawing Sheets

(56) References Cited

U.S. PATENT DOCUMENTS

| | | | |
|---|---|---|---|
| 6,376,168 B1 * | 4/2002 | Kawanishi | C07C 51/412 |
| | | | 430/620 |
| 7,055,699 B2 | 6/2006 | Takatsuka | |
| 2006/0043014 A1 | 3/2006 | Takatsuka | |

FOREIGN PATENT DOCUMENTS

| | | |
|---|---|---|
| CL | 0915-13 A1 | 12/2013 |
| CN | 101031346 A | 9/2007 |
| FR | 2 913 348 A1 | 9/2008 |
| JP | 2004-141785 A | 5/2004 |
| WO | 98/17370 A1 | 4/1998 |
| WO | 2006/080653 A1 | 8/2006 |
| WO | 2012/046240 A2 | 4/2012 |

OTHER PUBLICATIONS

Low Pressure Filter for LPS, Presentation by Netafim at Fresno, CA, 12 pages, modified Nov. 2, 2005. (provided to the applicant Nov. 2010).

Mahle Industrial Filtration, Automatic filter AF 173 G, 6 pages, (2008). (provided to the applicant Nov. 2010).

* cited by examiner

SELF CLEANING FILTER SYSTEM

FIELD OF THE DISCLOSED SUBJECT MATTER

The present disclosed subject matter relates to a self cleaning fluid filter system.

BACKGROUND OF THE DISCLOSED SUBJECT MATTER

Filtration systems are typically configured with a cleaning mechanism for removal of dirt and debris which typically accumulate over a surface of the filtration media of the filtration system.

Cleaning mechanisms offer scraping, rinsing by a jet of fluid emitted over the filter unit of suction applied thereto.

One such cleaning system is disclosed in U.S. Pat. No. 7,055,699 directed to a self-cleaning mechanical filter comprises a mechanism for simultaneously cleaning the internal surface and the external surface of a filter element. The filter is provided with structure for performing suction scanning of solid materials accumulated on the internal surface of the filter element, and structure which can be operated in synchronization with the suction scanning structure for backwashing the external surface of the filter element during a self-cleaning process.

SUMMARY OF THE DISCLOSED SUBJECT MATTER

According to the presently disclosed subject matter there is disclosed a self cleaning fluid filter system configured with a flushing and backspraying assembly, said system configured for initiating a self cleaning cycle manually or in a fully automated fashion.

According to the disclosed subject matter there is provided a fluid filtration unit comprising a housing accommodating a stationary cylindrical filter element, defining a raw fluid chamber extending between an inlet of the housing and raw fluid face of the cylindrical filter element, and a filtered fluid chamber extending between a filtered fluid face of the filter element and an outlet from said housing; a flushing and backspraying assembly comprising at least one flushing arm coupled to a lower pressure source and extending within the raw fluid chamber, and configured with a plurality of flushing nozzles disposed in close proximity with the raw fluid face of the filter element, and at least one backspraying arm coupled to a pressurized fluid source and extending within the filtered fluid chamber and configured with an array of backspraying nozzles disposed in close proximity with the filtered fluid face of the filter element; and a driving mechanism for selectively imparting said flushing and backspraying assembly with rotary and linear motion.

The term lower pressure source as used herein the specification and claims refers to pressure at the flushing arm and indicates pressure lower than the raw fluid pressure, wherein said lower pressure source can be atmospheric pressure or vacuum.

Any one or more of the following features and designs can be configured with a self cleaning filtration unit according to the present disclosure, separately or in combinations thereof:

The flushing nozzles and the backspraying nozzles are symmetrically disposed over both faces of the filter element such that opposite each flushing nozzle there is disposed a corresponding backspraying nozzle;

The flushing nozzles and the backspraying nozzles are coaxially and are disposed substantially normal to the respective raw fluid face and the filtered fluid face of the filter element;

The flushing nozzles and the backspraying nozzles are disposed such that their centerlines parallely extend though offset disposed over the filter element;

One or both of the flushing nozzles and the backspraying nozzles are disposed at an angle with respect to a radii of the cylindrical filtering element;

One or both of the flushing nozzles and the backspraying nozzles are pivotally displaceable about a longitudinal axis extending substantially parallel to a longitudinal axis of the filtering element;

A controller is provided for initiating a self cleaning cycle depending on a specified time interval lapsed from a previous cleaning cycle;

A controller is provided for initiating a self cleaning cycle depending on a predetermined volume of liquid passing through the filter;

A controller is provided for initiating a self cleaning cycle depending on a predetermined maximum differential pressure DP between the raw fluid and the filtered fluid;

Backwashing and flushing are simultaneously or selectively performed during a cleaning cycle;

The backspraying arm with the articulated backspraying nozzles and the flushing pipe with the articulated flushing nozzles revolve simultaneously;

The backspraying assembly further comprises a backspraying pipe coaxially extending with a flushing pipe, with a gap configured between the pipes such that there is created a tubular hollow space between an outer surface of the central backspraying pipe and an inner surface of the flushing pipe;

The at least one backspraying arm is in fluid flow communication with the backspraying pipe and the at least one flushing arm is in fluid flow communication with the tubular hollow space;

The backspraying assembly further comprises a connector element configured for supporting the at least one backspraying arm to the flushing pipe whilst providing a fluid flow path between the at least one backspraying arm and the backspraying pipe.

BRIEF DESCRIPTION OF THE DRAWINGS

In order to understand the present disclosed subject matter and to see how it can be carried out in practice, embodiments will now be described, by way of non-limiting examples only, with reference to the accompanying drawings, in which.

DETAILED DESCRIPTION OF EMBODIMENTS

Figure 1:
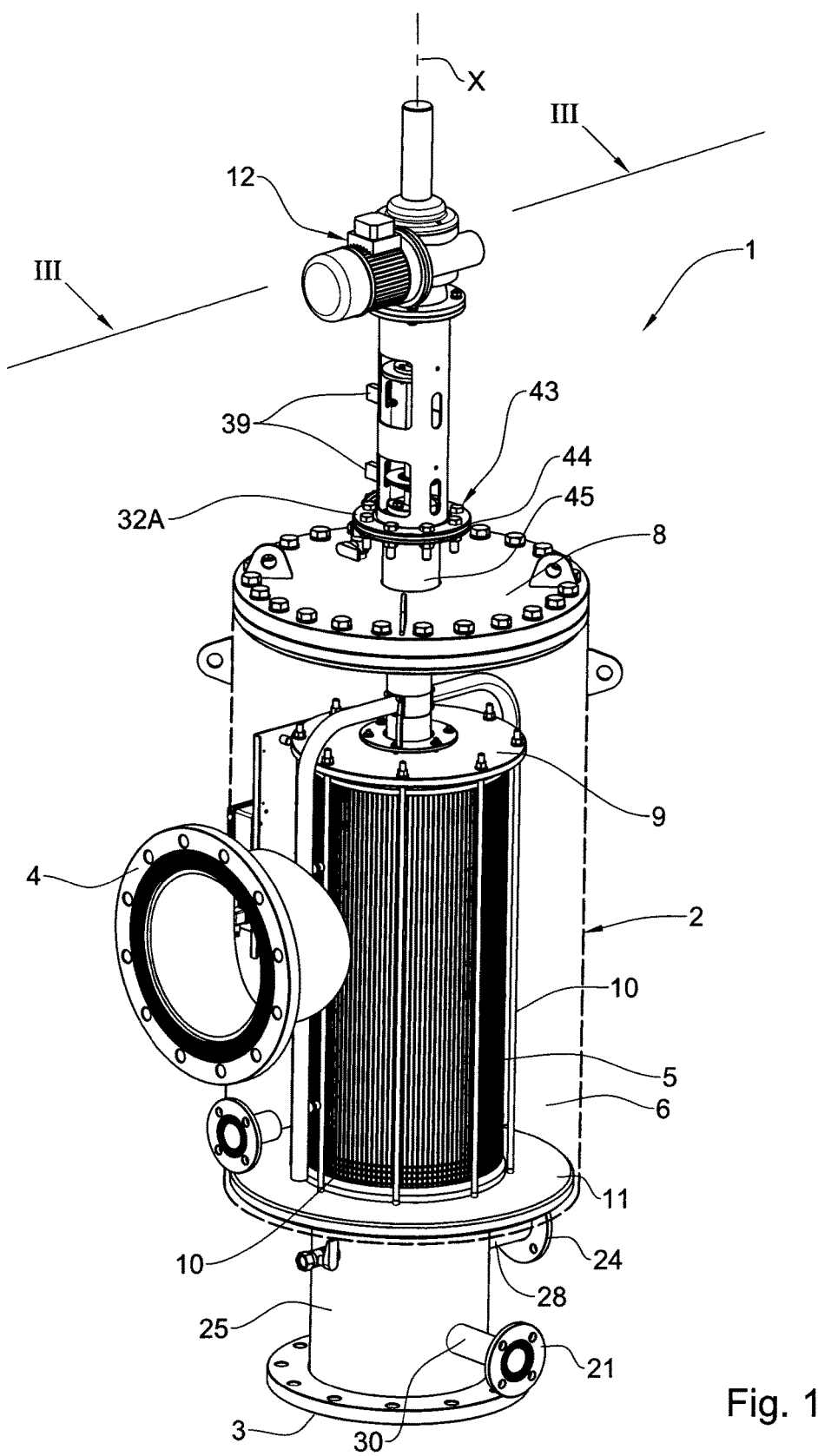
FIG. 1 is a perspective view of a self cleaning filter system according to the present disclosed subject matter, with portions of the housing made transparent for visualizing inside components of the filter.
Figure 2:
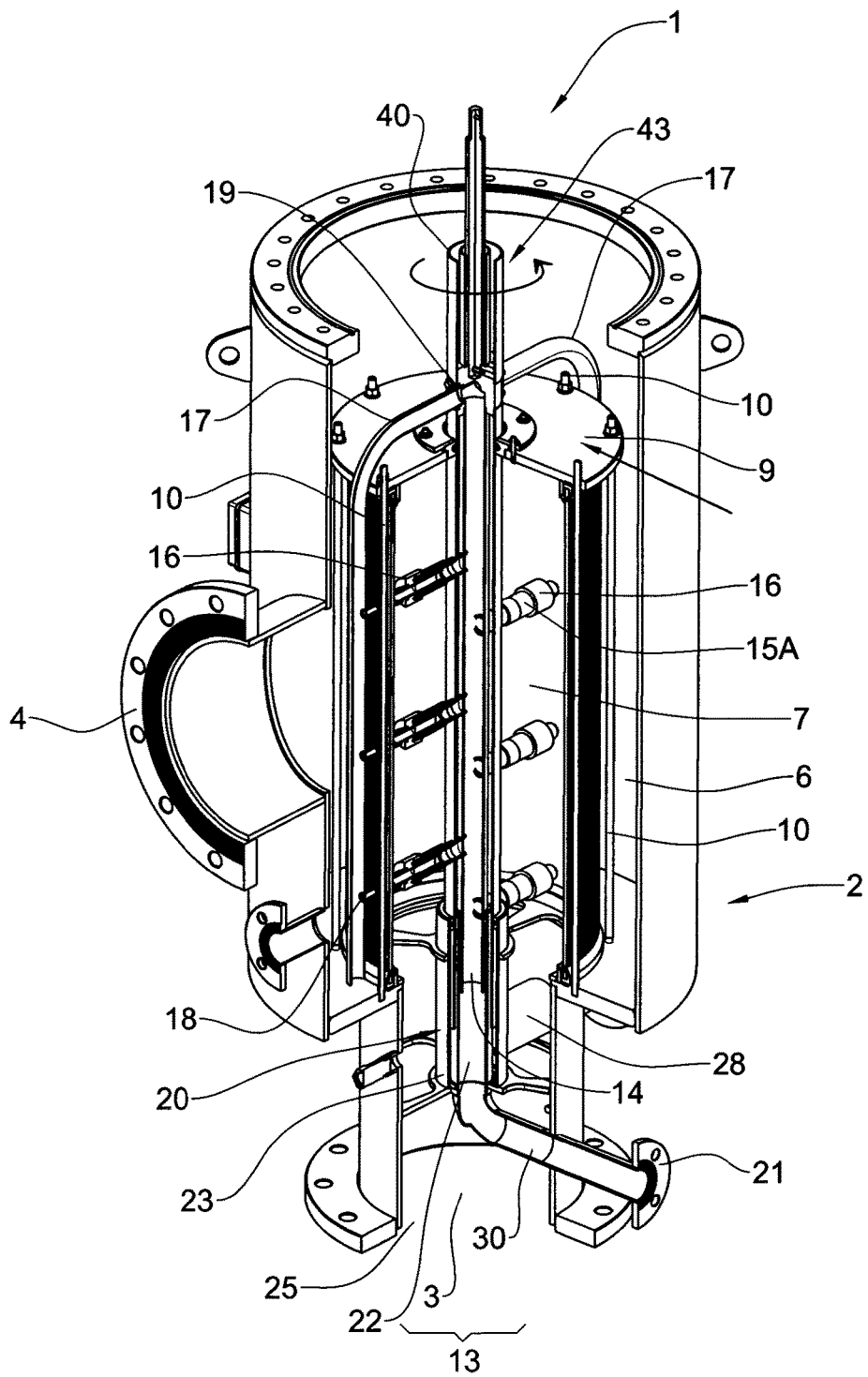
FIG. 2 is a cutaway perspective view of the self cleaning filter of FIG. 1, with its upper elements removed for clarification, with portions of the housing made transparent for visualizing inside components of the filter.
Figure 3A:
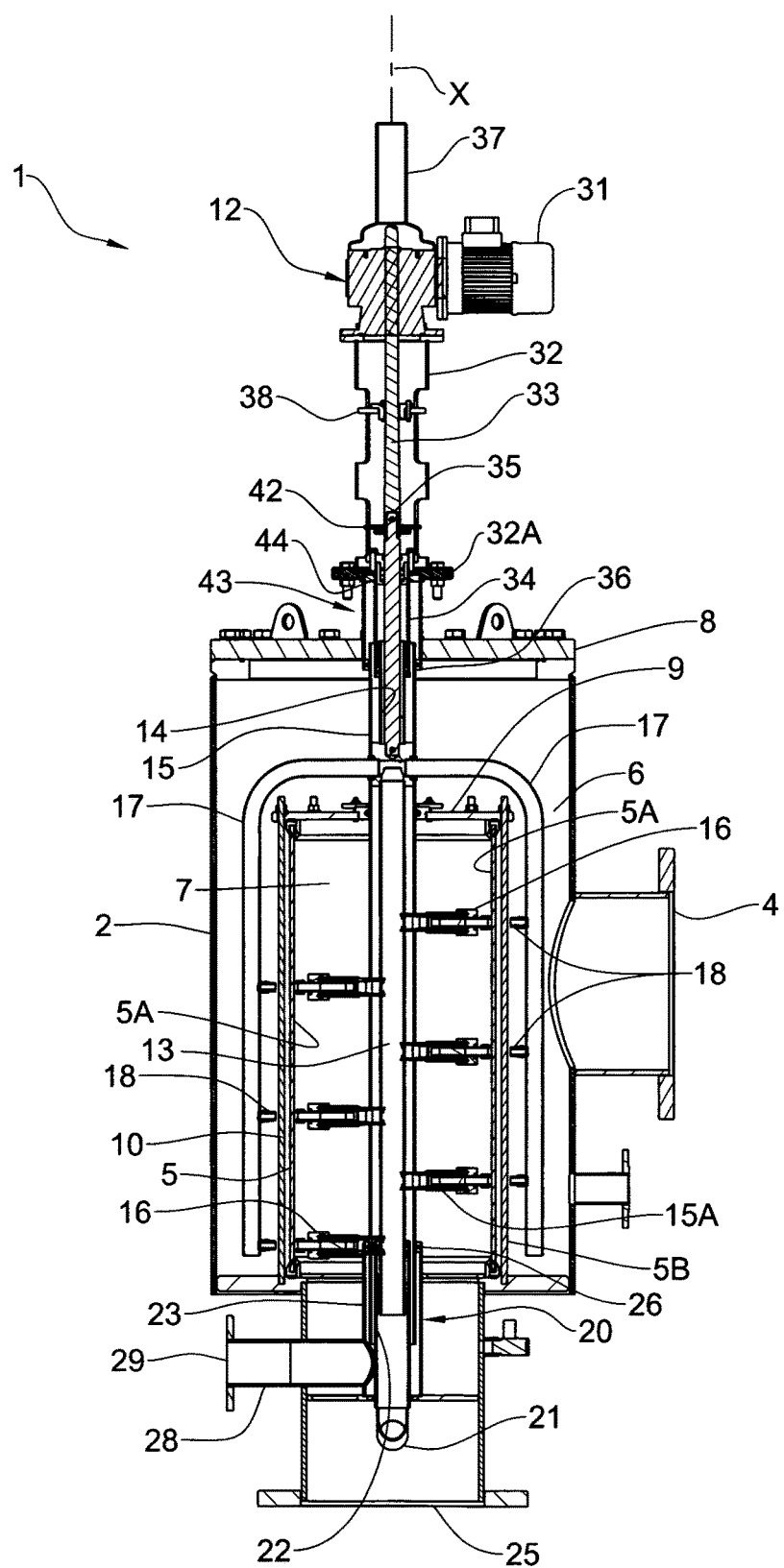
FIG. 3A is a longitudinal cross sectional view of the self cleaning filter, taken along line III-III in FIG. 1.

Referring to FIGS. 1, 2, and 3A, there is illustrated a self cleaning filter system 1 according to the present disclosed subject matter, comprising a cylindrical housing 2 (made transparent in FIGS. 1 and 2 for visualizing inside components of the filter) and configured with an inlet port 3 and an outlet port 4. A smaller diameter cylindrical filter element 5 rests concentrically within the housing 2, creating an outer space 6 (namely, a filtered fluid chamber) between an inside surface of the housing 2 and an outside surface of the filter element 5. An inner space 7 (namely, a raw fluid chamber) extends within the cylindrical filter element 5.

It is appreciated that the filter element 5 can in fact be any type of filtering unit, e.g. disk-type, thread-type, screen-type, pile-type, and the like.

In the present example, the cylindrical housing 2 is hydraulically sealed at its top end by a flanged endplate 8 and at the bottom end by endplate 11. Filter element 5 is secured to endplate 11 using screws 10 extending from a top filter cover plate 9 to the endplate 11. It is however appreciated that other forms of articulation of the filter element to the housing can be applied.

Figure 3B:
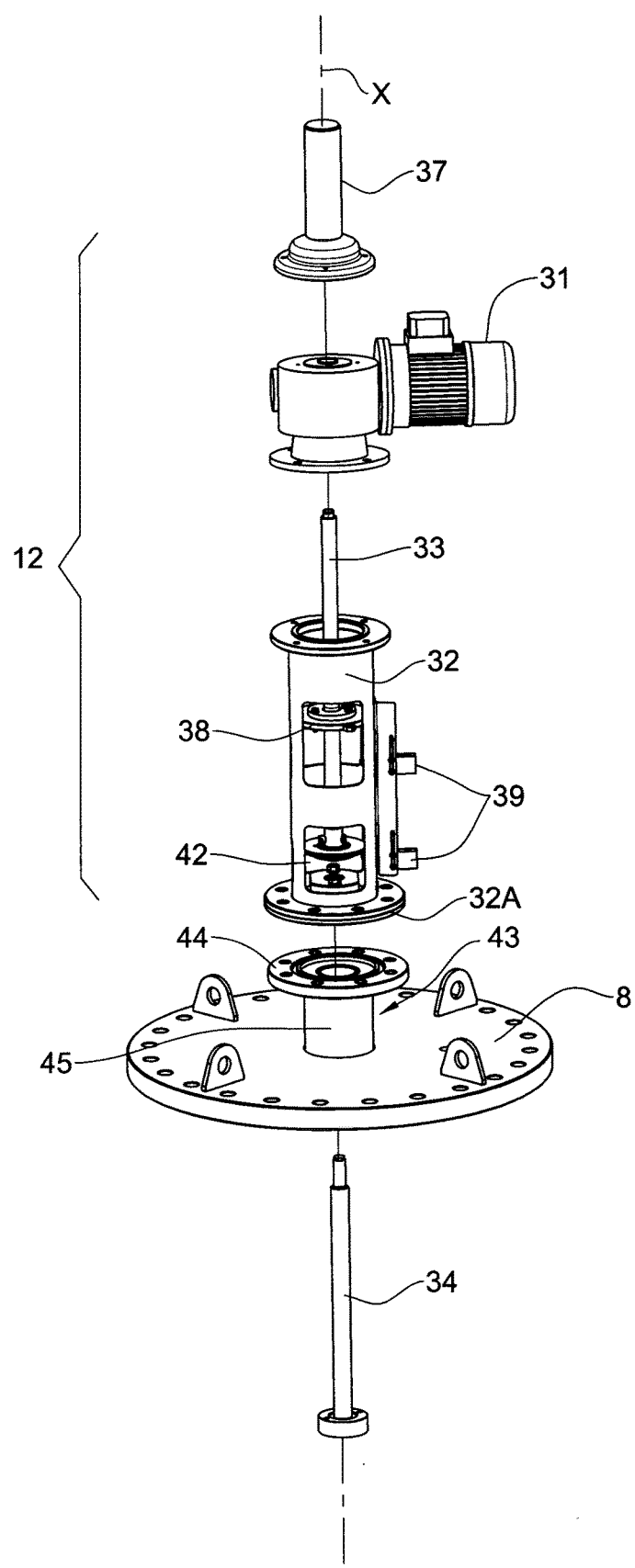
FIG. 3B is a perspective exploded view of a driving mechanism of the self cleaning filter.
Figure 3C:
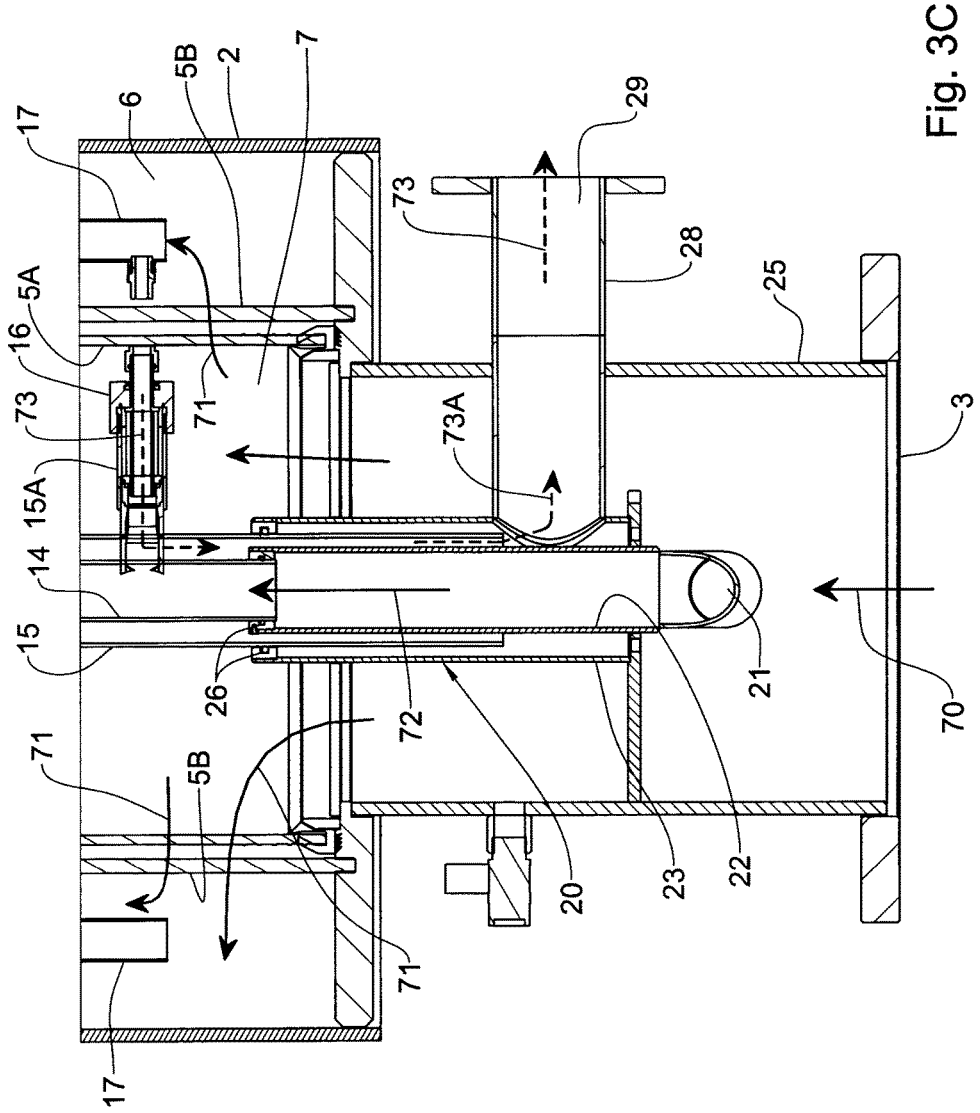
FIG. 3C is a longitudinal section of the lower portion of the self cleaning filter, schematically showing the flow paths within the self cleaning filter.

According to one example of the disclosed subject matter, inlet port 3 extends through as inlet pipe 25 communicates with the inner space 7 of the filter element 5, and outlet port 4 communicates with the outer space 6. Unfiltered raw liquid is introduced through inlet port 3 (the flow path 70 is illustrated in FIG. 3C by solid arrows) and enters inner space 7 within the filter element 5. The raw liquid then passes through the filter element 5 and the resulting filtrate enters outer space 6 (flow path 71 is illustrated in FIG. 3C by solid arrows) and is then discharged through outlet port 4.

The self cleaning filter system 1 further comprises a flushing and backspraying assembly generally designated 13 (best seen in FIGS. 2, 3A, 4A and 4B). The flushing and backspraying assembly 13 has a pipe-in-pipe configuration in which a central backspraying pipe 14 sits concentrically within a flushing pipe 15 with a gap between the pipes such that there is created a tubular hollow space between the outer surface of the central backspraying pipe 14 and the inner surface of the flushing pipe 15.

A plurality of flushing (suction) nozzles 16 laterally extend from the flushing pipe 15 via radially extending flushing arm assemblies 15A, said flushing nozzles 16 extending in close proximity to the inner surface 5A of the filter element 5 (i.e. a raw fluid face of the filter element) within the inner space 7 (seen in FIGS. 3A and 3C). The flushing and backspraying assembly 13 extends through a central aperture in the filter cover plate 9 to the outer space 6.

A pair of backspray pipe arms 17 connect via screws, or other fasteners, to a connector element 19 (shown in detail in FIG. 4C), facilitating communication between the central backspraying pipe 14 and the backspraying arms 17. The connector element 19 further separates different pressure regions while simultaneously allowing communication between like pressure regions as will be described below. A plurality of backspraying (rinsing, jet emitting) nozzles 18 project (radially in the illustrated example) from the backspraying pipe arms 17 close to the outer surface 5B of the filter element 5 (i.e. a filtered fluid face of the filter element; best seen in FIGS. 3A and 3C) and are positioned such that the backspraying nozzle outlets 50 are positioned directly opposite of corresponding flushing nozzle inlets 51.

Whilst in the present example there are illustrated a pair of backspraying pipe arms 17 and a flushing pipe fitted with radially opposed flushing arm assemblies 15A, it is appreciated that other configurations can be applied. For example, there may be one or three or any other practical number of backspraying pipe arms, with corresponding flushing arm assemblies radially projecting from a central flushing pipe or from several such flushing pipes.

It is however appreciated that the radial configuration of the flushing and backspraying assembly 13 as illustrated hereinabove is an example only, and other configurations are possible too, as discussed hereinafter with reference to FIGS. 6A to 6D.

The bottom end of the flushing and backspraying assembly 13 resides concentrically within a flushing and backspraying cell assembly 20 (FIGS. 2 and 3) which comprises another pipe-in-pipe arrangement with a backspraying cell pipe 22 concentrically residing within a flushing cell pipe 23. The diameter of the backspraying cell pipe 22 is slightly larger than the diameter of the central backspraying pipe 14, and the diameter of the flushing cell pipe 23 is slightly larger than that of the flushing pipe 15, allowing insertion of the double pipe assembly of the flushing and backspraying assembly 13 within the double pipe of the flushing and backspraying cell assembly 20.

Mechanical seals 26 at the upper edge of the flushing and backspraying cell assembly 20 protect against leakage at this insertion point to the inner space 7 of the filter element 5, the seals 26, however, allow for axial and rotational motion of the flushing and backspraying assembly 13 relative to the flushing and backspraying cell assembly 20.

The flushing and backspraying cell assembly 20 is rigidly connected to an inlet 25 of the filter unit 1, coupleable to a liquid line via a flanged portion thereof. The backspraying cell pipe 22 with a backspraying inlet port 21 has a radial pipe component 30 (FIG. 2) at the bottom of the flushing and backspraying cell assembly 20 and exits the inlet pipe 25 through a sealed aperture in the wall of the inlet pipe 25. Similarly, a flushing cell drain pipe 28 with flushing outlet port 29 is rigidly connected to the flushing cell pipe 23 and exits the inlet pipe 25 through a sealed aperture in the wall of the inlet pipe 25.

In a self cleaning cycle, a control device, e.g. a control valve, (not shown) located downstream of the flushing outlet port 29 opens to atmospheric pressure. The hollow space between the flushing pipe 15 and the backspraying cell pipe 22 thus has a lower ('negative') pressure relative to the higher pressure liquid flowing through the inner space 7 of the filter element 5, and thus suction is created at the opening of the flushing nozzles 16. This suction draws particulates that have been deposited on to the inside surface 5A of the filter element 5 during filtration, into the flushing pipe 15 to the flushing cell pipe 23, through the flushing cell drain pipe 28 and exiting through the flushing outlet port 29. The flushing flow path 73 and 73A is illustrated in FIG. 3C by dashed arrows.

In a backwash phase of the self cleaning cycle, pressurized fluid, gas or liquid, (typically liquid) from downstream the filter unit (i.e. after being filtered) is pressurized e.g. by a pressure unit (not shown and/or by an external pressurized source of fluid, is introduced though backspraying inlet 21 and flows through radial pipe element 30 and into backspraying cell pipe 22. The liquid then enters the flushing and backspraying assembly 13 through central backspraying pipe 14 (as seen in flow path 72 of FIG. 3C) it is directed via the connector element 19 into the backspraying arms 17 and is sprayed out of the backspraying nozzles 18 onto the outer surface 5B of filter element 5.

Another part of the self cleaning system comprises a driving mechanism 12 mounted above the flanged endplate 8 of the filter housing 2. The driving mechanism 12, as seen if FIG. 3B, comprises a geared motor 31 that rotates a drive shaft 33. The motor 31 can be electric or hydraulic type. The drive shaft 33, which is a revolving screw, rests within a drive housing 32. The drive shaft 33 connects at its bottom end via pin 35 to an axle 34 along a common longitudinal axis. As seen best in FIGS. 3A and 4B, the axle 34 is aligned along the same longitudinal axis X as that of the central backspraying pipe 14 and connects to the top side of the connector element 19 via pin 36 thus creating a single rigid rotational transmission system between the driving mechanism 12 and flushing and backspraying assembly 13.

During self cleaning operation, the geared motor 31 drives the drive shaft 33 which in turn transmits rotational and axial motion to the flushing and backspraying assembly 13 via its connection to the axle 34, causing the flushing nozzles 16 and backspraying nozzles 18 to rotate and axially reciprocate (move in an up and down direction) in a synchronized fashion, thus scanning substantially the entire inner surface 5A and outer surface 5B of the filter element 5. The axial motion of the drive shaft is limited for example, by toggle switches 39 mounted to the drive housing 32 and drive shaft switch plate 38 as well as axle switch plate 42. Also, the suction is continuous during combined revolving and reciprocal axial displacement of the flushing and backspraying assembly.

Figure 5A:
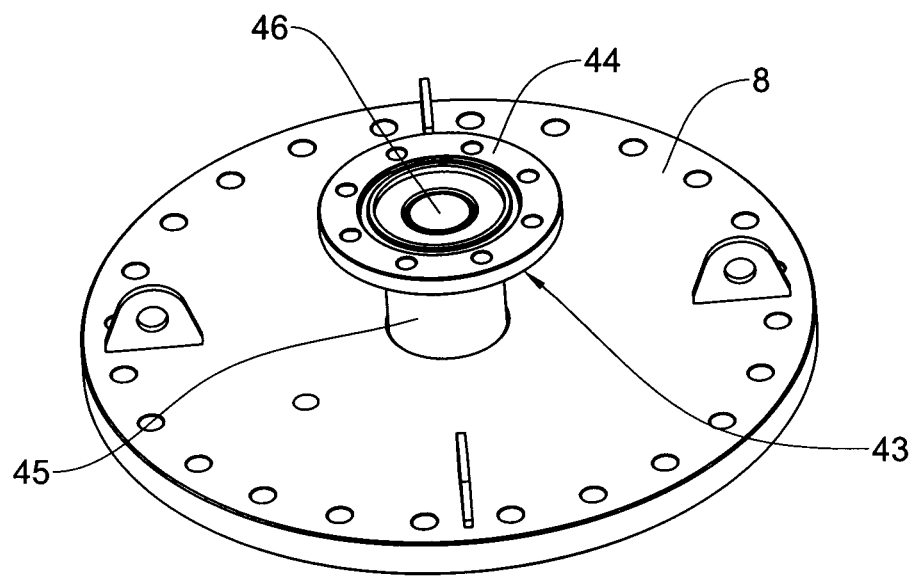
FIG. 5A is a perspective view of a detail of a flanged endplate with upper flushing cell used in the self cleaning filter.
Figure 5B:
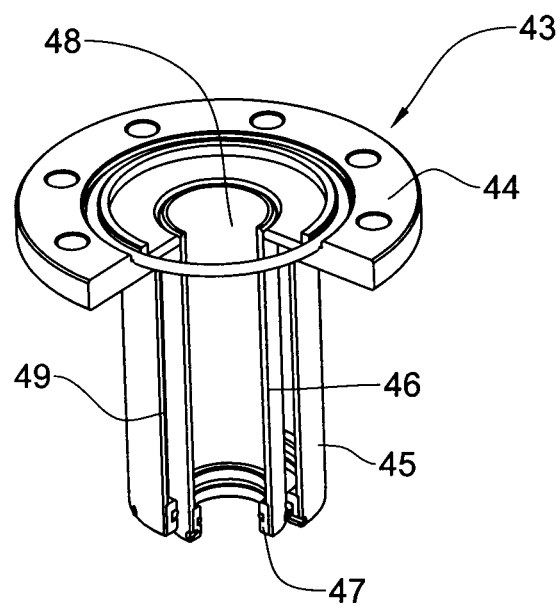
FIG. 5B is a cutaway perspective view of the upper flushing cell seen in FIG. 5A.

An upper flushing cell 43 (FIG. 5B) is rigidly connected via a flange 44 on its upper side to a flange 32A of the drive housing 32 of the driving mechanism 12, and on its bottom side is fixed, e.g. by welding over the flanged endplate 8. FIGS. 5A and 5B show the upper flushing cell 43 positioned over the flanged endplate 8 and a cutaway perspective view of the upper flushing cell 43 respectively. The upper flushing cell 43 comprises an external pipe 45 and inner pipe 46 which are concentric, each pipe affixed with a mechanical seal element 47 at the bottom of each pipe respectively. The space between the inner surface of the outer pipe 45 and the outer surface of the inner pipe 46 defines an upper flushing chamber 49. The diameter of the outer pipe 45 is sized such that a flushing pressure pipe 40 (seen best in FIGS. 4A and 4B) can be inserted within the outer pipe 45, and the diameter of inner pipe 46 is sized such that a backspraying pressure pipe 41 (seen best in FIGS. 4A and 4B) can be inserted within it, and together with mechanical seal elements 47 (FIG. 5B) create a seal between the insertion while allowing axial and rotational motion at the sealing points.

The flange 44 has a center aperture 48 through which the flushing axle 34 passes. Flushing pressure pipe 40 and backspraying pressure pipe 41 the upper portion of the flushing and backspraying assembly 13 connecting directly to the connector element 19.

In order to provide a balance of pressures exerted on the upper and lower portions of the flushing and backspraying assembly 13 during a self cleaning operation, the pressures within the upper flushing cell 43 and flushing and backspraying cell assembly 20 require balancing.

Figure 4A:
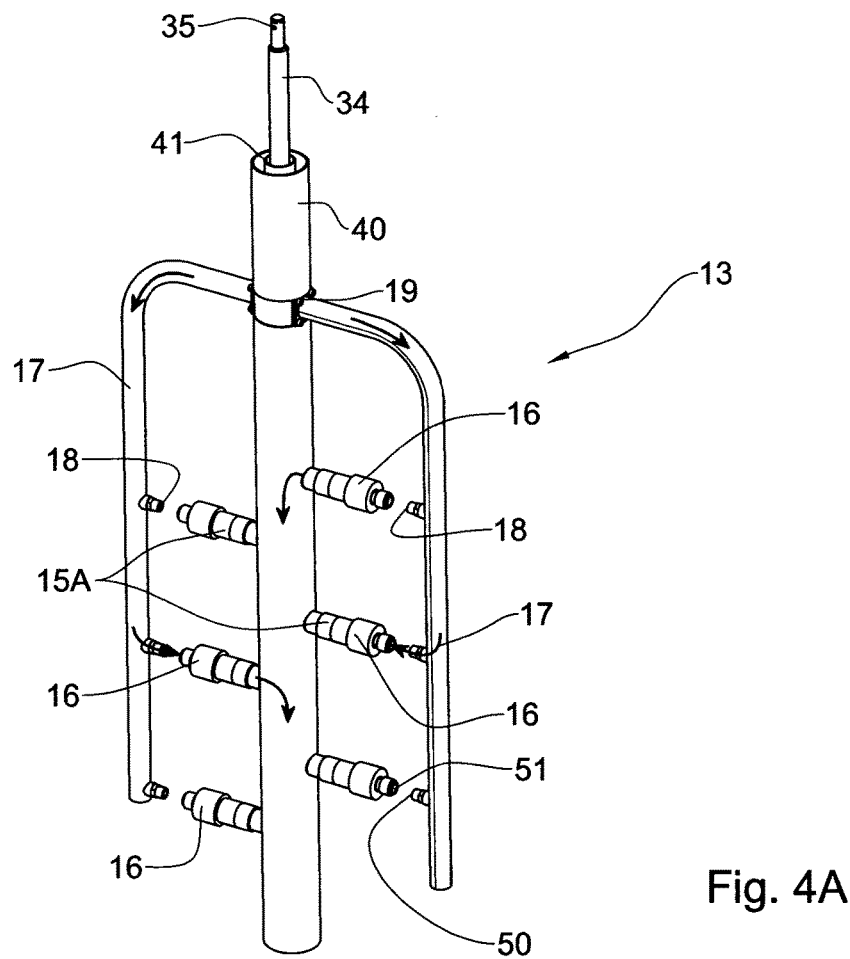
FIG. 4A is a perspective view of a flushing and backspraying assembly used in the self cleaning filter.
Figure 4B:
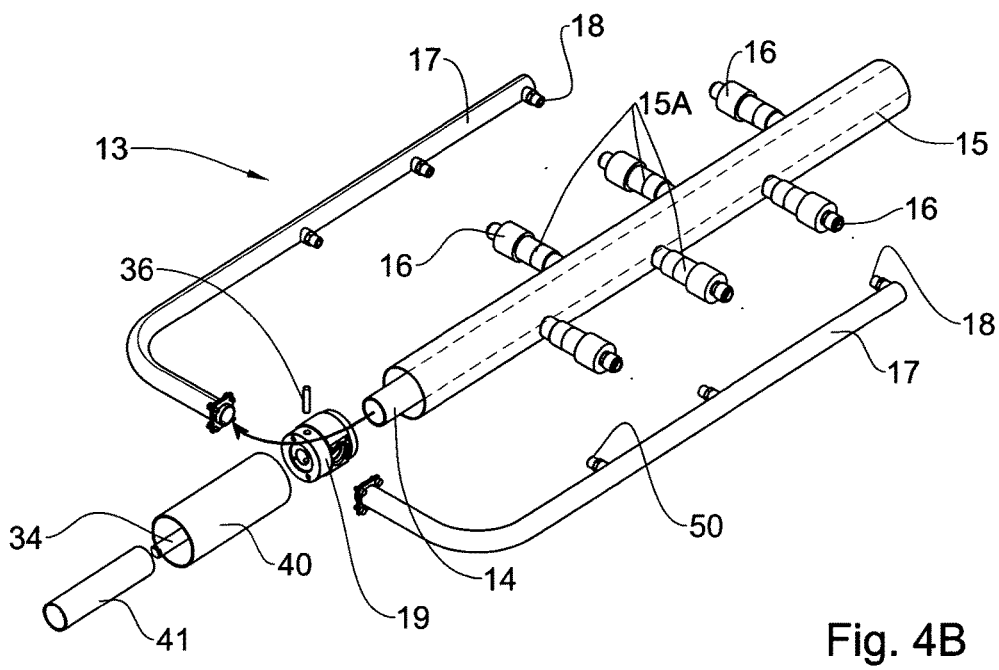
FIG. 4B is an exploded perspective view of the flushing and backspraying assembly of FIG. 4A.
Figure 4C:
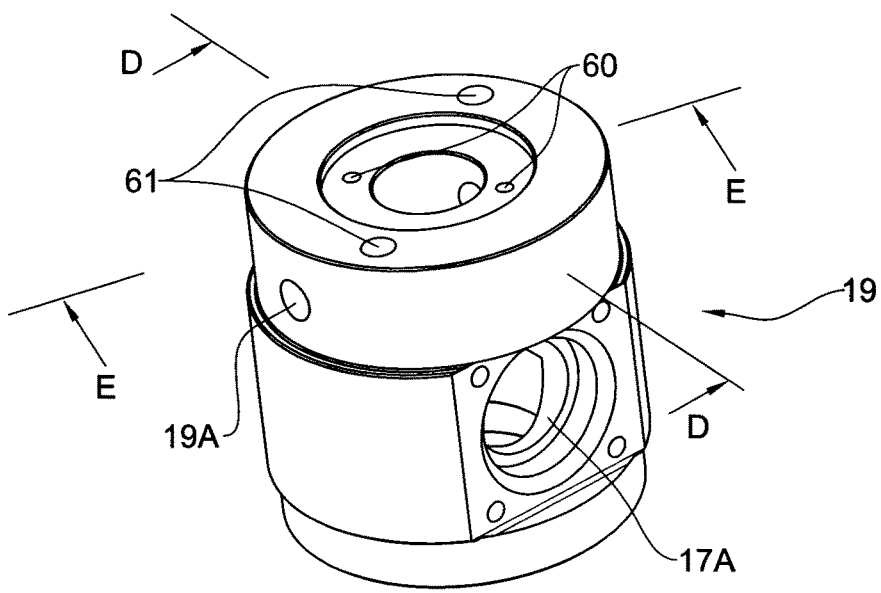
FIG. 4C is a perspective view of a connector element within the flushing and backspraying assembly.
Figures 4D, 4E:
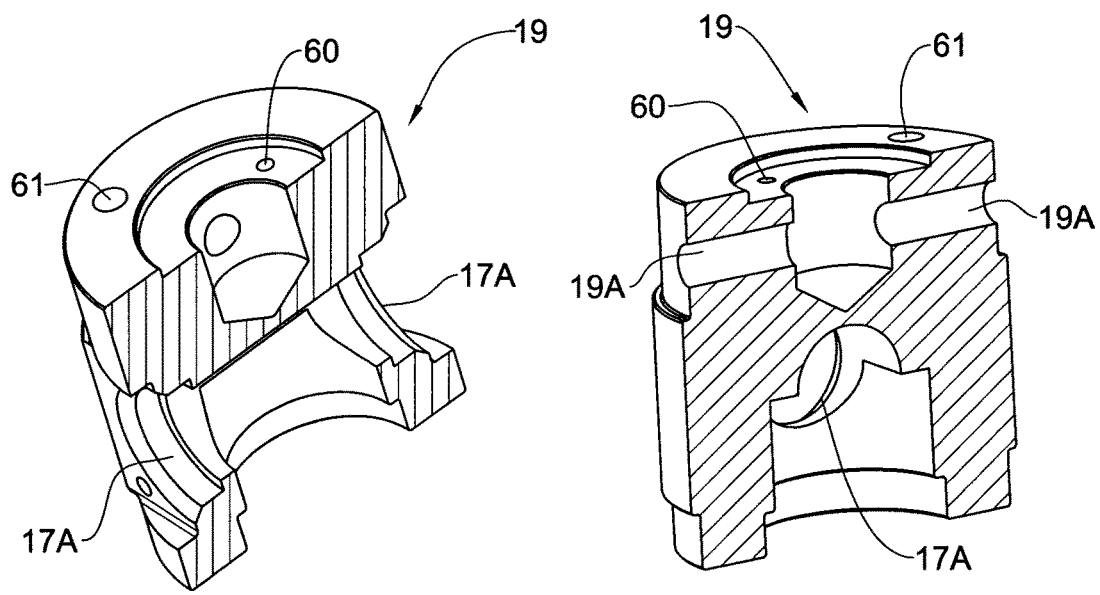
FIG. 4D is a section along line D-D in FIG. 4C.
FIG. 4E is a section along line E-E in FIG. 4C.

FIGS. 4C to 4E show the connector element 19. Thoroughgoing flushing bores 60 allow for high pressure fluid communication between the space within central backspraying pipe 14 and backspraying pressure pipe 41 and thus provide a balance of pressure in the backspraying regions defined by the space within backspraying cell pipe 22, central backspraying pipe 14, backspraying arms 17 (screw coupled to the connector element 19 at 17A) and backspraying pressure pipe 41. Similarly, suction bores 61 allow for low pressure fluid communication between the space within flushing pipe 15 and flushing pressure pipe 40 providing a balance of pressure between the flushing regions defined by flushing cell pipe 23, flushing pipe 15 along with flushing arm assemblies 15A and flushing pressure pipe 40. This axial pressure balance ensures that movement of the flushing and backspraying assembly 13 by means of the driving mechanism 12 will not be affected by the pressures within the flushing and backspraying regions, and thus axial forces exerted on the driving mechanism are balanced. Bores 19A serve for rotatably coupling the connector element 19 with the articulated backspraying arms 17 to the axle 34, by the coupling pin 36.

FIGS. 6A to 6D are directed to different configurations of each a cross section through a flushing and backspraying assembly 13, showing several configurations of the current disclosed subject matter.

Figure 6A:
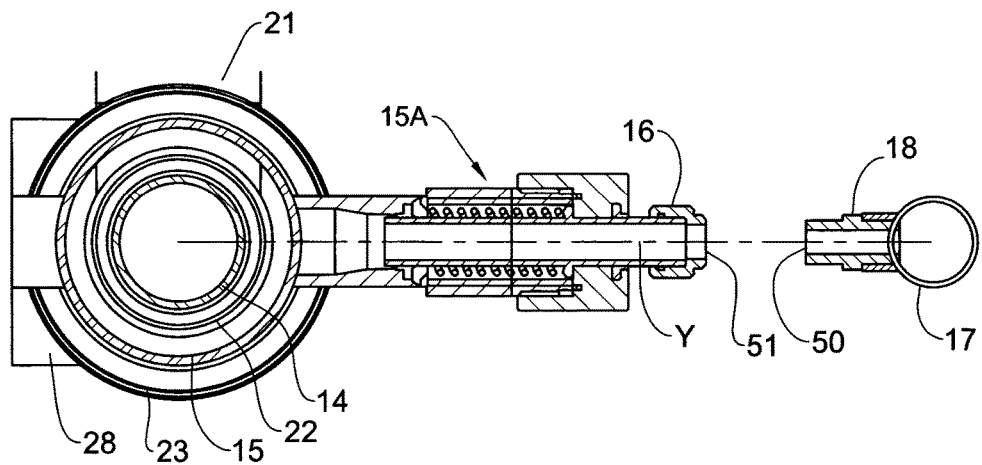
FIGS. 6A to 6D are planar, top sectional views through flushing nozzles and backspraying nozzles showing examples of different nozzle configurations; and, FIG. 7 is a chart illustrating differential pressure vs. time showing performance of a control sequence for the self cleaning filter.

FIG. 6A is an example of the above described nozzle arrangement in which the center of backspraying arm 17 is co-linear (coaxial) with the centerline Y of flushing nozzles 16 such that that the plane of the flushing nozzle inlet 51 and the plane of the backspraying nozzle outlet 50 are parallel and directly opposed to each other, in a substantially radial configuration, i.e. substantially normal to the respective inside and outside surface of the filter element 5.

Figure 6B:
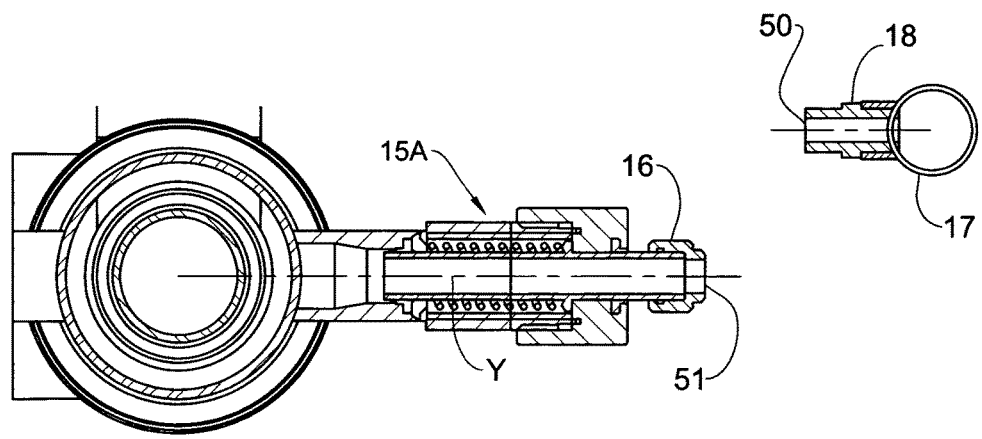

FIG. 6B is an example of an arrangement of the flushing and backspraying assembly 13 such that center of backspraying arm 17 is parallel though offset from the centerline Y of the flushing nozzles 16 while the plane of the flushing nozzle inlet 51 remains parallel to the plane of the backspraying nozzle outlet 50 resulting an offset between the openings of the nozzles.

Figure 6C:
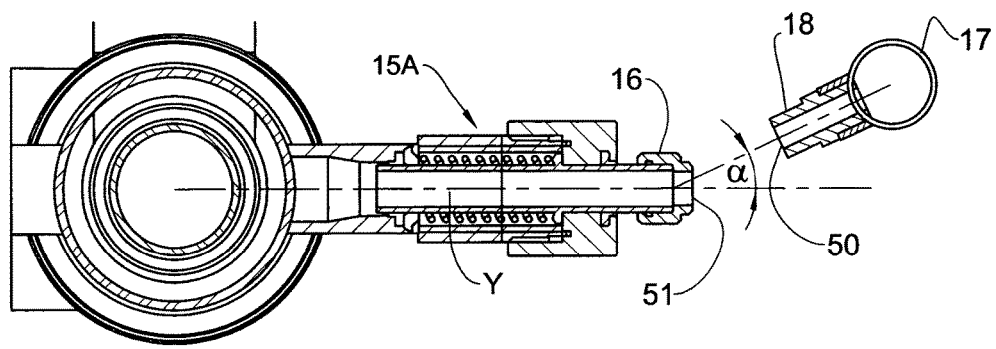

In another example, FIG. 6C shows an offset arrangement of the center of backspraying arm 17 relative to the centerline of the flushing nozzles 16 with the plane of the backspraying nozzle outlet 50 rotated at an angle α (i.e. intersecting) relative to the plane of the centerline Y of the flushing nozzle inlet 51. The rotation angle is provided such that the backspraying nozzle outlet 50 points substantially toward the flushing nozzle inlet 51.

Figure 6D:
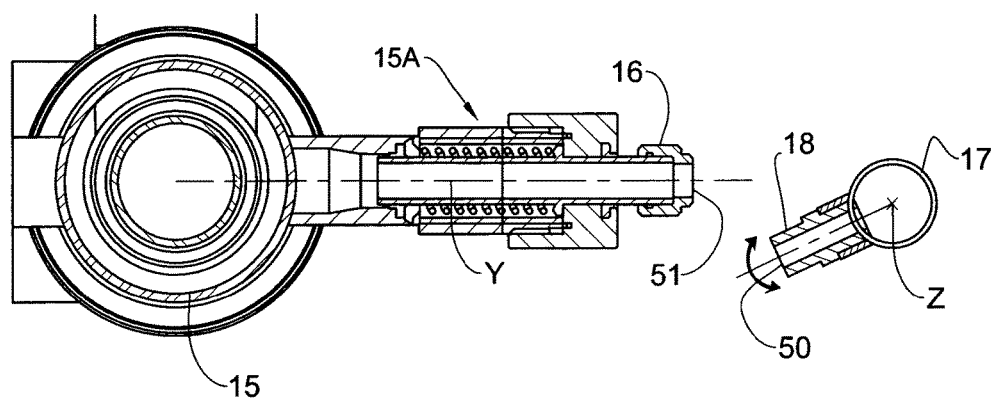

FIG. 6D shows another example of an arrangement of the flushing and backspraying assembly 13 in which the center of backspraying arm 17 is co-linear with the centerline Y of flushing nozzles 16 while the plane of the backspraying nozzle outlet 50 is angularly reciprocal about the longitudinal axis Z of the backspraying arm 17, for example by a hydraulic motor (not shown).

Operation of the cleaning cycle of the self cleaning filter can be fully automated. In one mode of operation backwashing and flushing can be performed simultaneously during every cleaning cycle. Alternatively, only flushing or only backwashing can be performed (though the backspraying arm 17 with the articulated backspraying nozzles 18 and the flushing pipe 15 with the articulated flushing nozzles 16 revolve together). The cleaning cycle can be initiated based on a specified time interval, or initiated based on a predetermined volume of liquid passing through the filter, or by a predetermined maximum differential pressure DP between the raw entering water and the filtrate leaving the filter or by combination thereof (a combination can include any two or more control parameters). The length of time for the cleaning process can also be automated or preset, or monitored by sensors.

Figure 7:
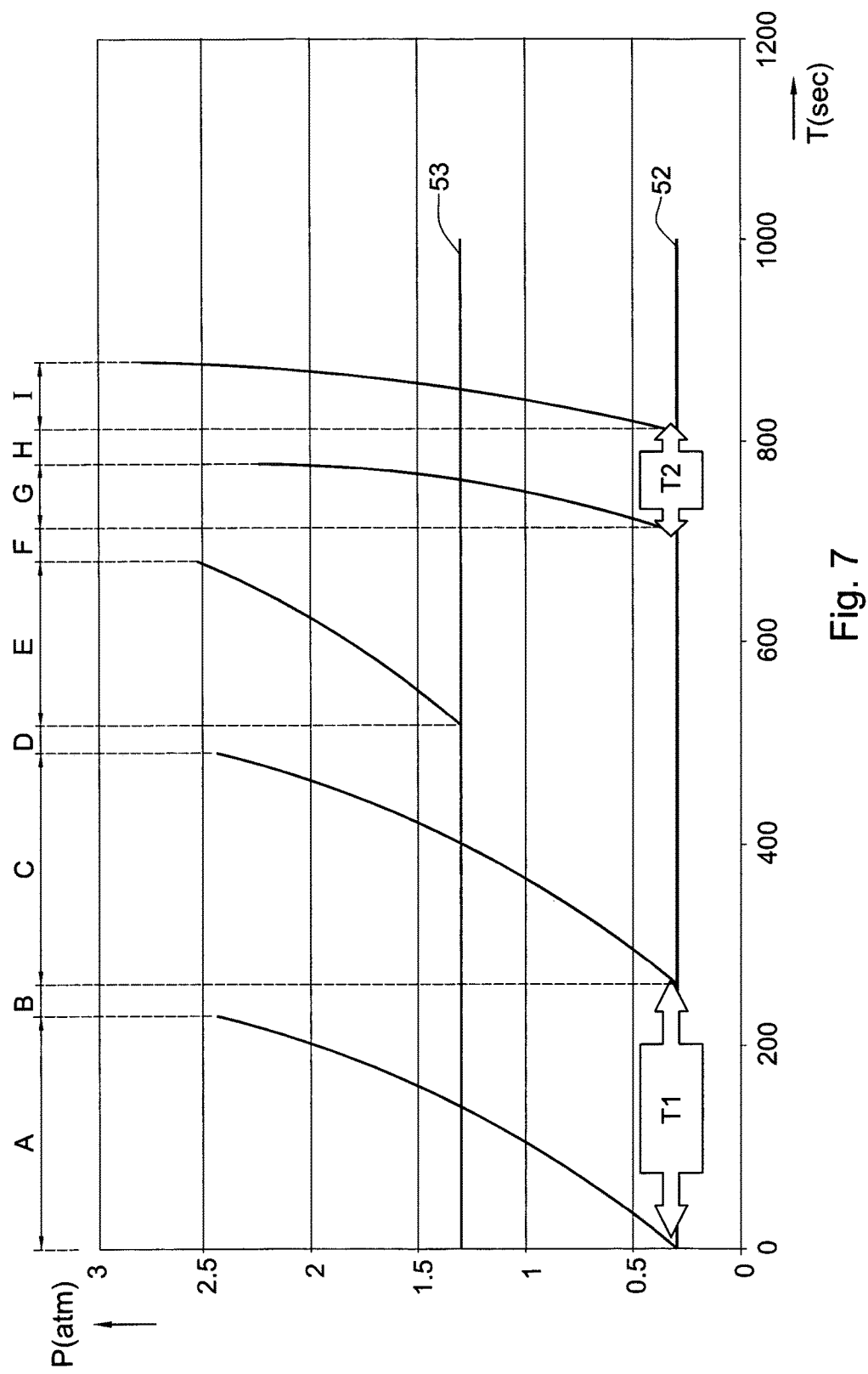

FIG. 7 is a chart displaying an example of an automated operation sequence for the flushing and backspraying self cleaning filter 1. The chart displays recorded values of DP between the raw liquid before passing through the filter element and the filtrate after passing through the filter element. Particulates begin to accumulate on the filter inner surface and thus the DP increases as seen in section A of the chart. When this DP reaches a designated preset maximum value, the flushing cleaning process is initiated. This cleaning mode as seen in section B of the chart can reduce the DP close to the initial value marked as horizontal line 52. Section C shows DP value once again rising toward the preset maximum allowable limit with continued normal filtering operation. In section D the flushing cleaning process again occurs, in this stage however, the flushing process alone was unable to reduce the DP close to the initial value of horizontal line 52, and the DP remained at a higher value as seen by horizontal line 53, the value of which can be preset, indicating that the flushing process alone was unable sufficiently clean the filter.

As filtration occurs in section E the DP reaches the maximum preset value, however since the previous cleaning cycle of Section D was unable to reduce the DP below a preset high value of horizontal line 53, backwashing cleaning process is initiated along with the flushing cleaning process as seen in section F, and the DP returns close to its initial value of horizontal line 52. Filtration continues as seen in section G, and an additional backwashing and flushing operation is seen in section H. Determination of cleaning cycle can also be based on time intervals as seen in the chart of FIG. 7. A specified time interval can be preset which will determine whether flushing cleaning alone occurs, or both flushing and backwashing occur. T1 and T2 are periods of time between cleaning cycles. The cleaning cycle following the longer time period T1 can be a flushing cleaning process alone, and the cleaning cycle following shorter time period T2 can be both flushing and backwashing processes as preset by the user.

Whilst particular embodiments have been exemplified, it is to be appreciated that the disclosed subject mater is not limited thereto and other embodiments and modifications are possible too, mutates mutandis.

For example, it is optional that the liquid inlet and outlet ports are reversed and likewise, the flushing and backspraying assembly can be configured such that the flushing nozzles are external to the filter element and the suction nozzles are internal, or vise versa.

In another example, flushing nozzles and suction nozzles can be fixed and the filter element can be moved relative to the nozzles to provide scanning of the entire filter element. One particular example involves rotation of the filter element and reciprocal axial displacement of the flushing and rinsing nozzles, however as long as substantially full area scan of the filter element is obtained during a self cleaning process.

It is also appreciated that the configuration disclosed hereinabove is one option and however, a reverse flow configuration can be designed as well, wherein filtration of liquid through the filter element takes place either in an inside-outside direction (as disclosed hereinabove) or in a reverse direction, i.e. an outside-inside direction. According to such a configuration flow through the unit is reversed wherein the outlet 4 now serves as an inlet port for raw fluid and the inlet port 3 now serves as an outlet for the filtered fluid. Accordingly, the outer space 6 receives the raw fluid and fluid is filtered as it flows through the filter element 5 into the inner space 7 and then out through port 3. Respectively, the nozzles 18 are suction nozzles and the nozzles 16 are jet emitting nozzles, i.e. functioning oppositely than the disclosure in connection with the previously disclosed example, however with appropriate fluid flow reversing changes as required, mutatis mutandis.

It is also appreciated that the whilst in the illustrated example the inlet port and the outlet port are perpendicular to one another, this is a mere example and other configurations are possible too. For example, the inlet port and the outlet port can extend about parallel or even coaxial axes.

The invention claimed is:

1. A fluid filtration unit comprising:
a housing accommodating a stationary cylindrical filter element, defining a raw fluid chamber extending between an inlet of the housing and a raw fluid face of the stationary cylindrical filter element, and a filtered fluid chamber extending between a filtered fluid face of the stationary cylindrical filter element and an outlet from said housing;
a flushing and backspraying assembly comprising
at least one flushing pipe coupled to a lower pressure source and extending within the raw fluid chamber, and configured with a plurality of flushing nozzles disposed in close proximity with the raw fluid face of the stationary cylindrical filter element;
at least one backspraying pipe;
at least one backspraying arm in fluid communication with the at least one backspraying pipe and coupled to a pressurized fluid source and extending within the filtered fluid chamber and configured with an array of backspraying nozzles disposed in close proximity with the filtered fluid face of the stationary cylindrical filter element;
a driving mechanism for selectively imparting said flushing and backspraying assembly with rotary and linear motion; and
wherein the at least one backspraying pipe is in a pipe-in-pipe configuration with, and sits within, the at least one flushing pipe, providing a gap between the at least one backspraying pipe and the at least one flushing pipe such that there is created in said gap a tubular hollow space between an outer surface of the backspraying pipe and an inner surface of the flushing pipe.

2. The fluid filtration unit according to claim 1, wherein the flushing nozzles and the backspraying nozzles are symmetrically disposed over both faces of the stationary cylindrical filter element such that opposite each flushing nozzle there is disposed a corresponding backspraying nozzle.

3. The fluid filtration unit according to claim 1, wherein the flushing nozzles and the backspraying nozzles are coaxial and are disposed substantially normal to the respective raw fluid face and the filtered fluid face of the stationary cylindrical filter element.

4. The fluid filtration unit according to claim 1, wherein the flushing nozzles and the backspraying nozzles are disposed such that their centerlines extend parallel though offset disposed over the stationary cylindrical filter element.

5. The fluid filtration unit according to claim 1, wherein one or both of the flushing nozzles and the backspraying nozzles are disposed at an angle with respect to a radii of the cylindrical filtering element.

6. The fluid filtration unit according to claim 1, wherein one or both of the flushing nozzles and the backspraying nozzles are pivotally displaceable about a longitudinal axis extending substantially parallel to a longitudinal axis of the filtering element.

7. The fluid filtration unit according to claim 1, wherein a controller is provided for initiating a self-cleaning cycle depending on a specified time interval lapsed from a previous cleaning cycle.

8. The fluid filtration unit according to claim 1, wherein a controller is provided for initiating a self-cleaning cycle depending on a predetermined volume of liquid passing through the filter.

9. The fluid filtration unit according to claim 1, wherein a controller is provided for initiating a self cleaning cycle depending on a predetermined maximum differential pressure DP between the raw fluid and the filtered fluid.

10. The fluid filtration unit according to claim 1, configured such that backwashing and flushing are simultaneously or selectively performed during a cleaning cycle.

11. The fluid filtration unit according to claim 1, wherein the backspraying arm with the backspraying nozzles and the flushing pipe with the articulated flushing nozzles are configured to revolve simultaneously.

12. The fluid filtration unit according to claim 1, wherein at least one flushing arm assembly is in fluid flow communication with the tubular hollow space.

13. The fluid filtration unit according to claim 1, wherein the backspraying assembly further comprises a connector element configured for supporting the at least one backspraying arm to the flushing pipe whilst providing a fluid flow path between the at least one backspraying arm and the backspraying pipe.

14. A fluid filtration unit comprising:
    (a) a housing accommodating a stationary cylindrical filter element, defining a raw fluid chamber extending between an inlet of the housing and a raw fluid face of the stationary cylindrical filter element, and a filtered fluid chamber extending between a filtered fluid face of the stationary cylindrical filter element and an outlet from said housing;
    (b) a flushing and backspraying assembly comprising
        at least one flushing pipe coupled to a lower pressure source and extending within the raw fluid chamber, and configured with a plurality of flushing nozzles disposed in close proximity with the raw fluid face of the stationary cylindrical filter element;
        at least one backspraying pipe;
        at least one backspraying arm in fluid communication with the at least one backspraying pipe and coupled to a pressurized fluid source and extending within the filtered fluid chamber and configured with an array of backspraying nozzles disposed in close proximity with the filtered fluid face of the stationary cylindrical filter element;
        a driving mechanism for selectively imparting said flushing and backspraying assembly with rotary and linear motion; and
    wherein the at least one backspraying pipe is in a pipe-in-pipe configuration with, and sits within, the at least one flushing pipe, providing a gap between the at least one backspraying pipe and the at least one flushing pipe such that there is created in said gap a tubular hollow space between an outer surface of the backspraying pipe and an inner surface of the flushing pipe; and
    (c) a flushing and backspraying cell assembly rigidly connected to the inlet of the housing, and including:
        a backspraying cell pipe and a flushing cell pipe, wherein the backspraying cell pipe is in pipe-in-pipe configuration with, and sits within, the flushing cell pipe,
        wherein a bottom end of said flushing and backspraying assembly is sealing mounted with said flushing and backspraying cell assembly while allowing for axial and rotational motion of the said flushing and backspraying assembly with respect to said flushing and backspraying cell assembly.

15. The fluid filtration unit according to claim 14, wherein the flushing nozzles and the backspraying nozzles are symmetrically disposed over both faces of the stationary cylindrical filter element such that opposite each flushing nozzle there is disposed a corresponding backspraying nozzle.

16. The fluid filtration unit according to claim 14, wherein the flushing nozzles and the backspraying nozzles are coaxial and are disposed substantially normal to the respective raw fluid face and the filtered fluid face of the stationary cylindrical filter element.

17. The fluid filtration unit according to claim 14, wherein the flushing nozzles and the backspraying nozzles are disposed such that their centerlines extend parallel though offset disposed over the stationary cylindrical filter element.

18. The fluid filtration unit according to claim 14, wherein at least one flushing arm assembly is in fluid flow communication with the tubular hollow space.

19. The fluid filtration unit according to claim 14, wherein the backspraying assembly further comprises a connector element configured for supporting the at least one backspraying arm to the flushing pipe whilst providing a fluid flow path between the at least one backspraying arm and the backspraying pipe.

* * * * *